United States Patent [19]
Brummett

[11] Patent Number: 6,119,625
[45] Date of Patent: Sep. 19, 2000

[54] TOOL FOR APPLYING FLUID MATERIAL TO A COMESTIBLE PRODUCT

[76] Inventor: Barry J. Brummett, 10841 Skyline Dr., Santa Ana, Calif. 92705

[21] Appl. No.: 09/287,073

[22] Filed: Apr. 6, 1999

Related U.S. Application Data

[62] Division of application No. 09/028,964, Feb. 24, 1998.
[51] Int. Cl.[7] .............................. A23G 3/20; A23G 3/28; B65G 11/00
[52] U.S. Cl. ................................ 118/13; 118/14; 118/20; 193/2 R
[58] Field of Search ..................................... 209/244, 240; 193/2 R; 118/13, 14, 20

[56] References Cited

U.S. PATENT DOCUMENTS

| | | |
|---|---|---|
| 129,965 | 7/1872 | Kendall et al. . |
| 468,247 | 2/1892 | Jewett . |
| 3,280,973 | 10/1966 | Cartwright et al. . |
| 5,114,040 | 5/1992 | Brenish et al. . |
| 5,632,819 | 5/1997 | Geissler . |

*Primary Examiner*—Anthony J. Weier

*Attorney, Agent, or Firm*—Knobbe, Martens, Olson & Bear, LLP

[57] ABSTRACT

A method and apparati for preparing and displaying a donut having a "fresh-baked" quality in a retail environment principally uses standard equipment available in a typical convenience store or quick-service restaurant. The method utilizes pre-frozen donuts manufactured at a centralized manufacturing facility and involves thawing, storing and heating the frozen donuts at the point-of-service. The donuts are thawed under refrigeration but in a generally humidity-constant environment. This on-site procedure allows a retailer to quickly and conveniently produce a moist, fresh-tasting donut with minimum equipment and effort. Furthermore, the present production method allows the retailer to control the number and type of donuts produced for sale, thereby substantially eliminating waste and allowing the retailer to immediately tailor donut production to local consumer demand. An improved applicator eases the glazing process to permit relatively inexperienced personnel to properly glaze the donuts. The finished donuts are then displayed in a display cabinet which uses both hot and cold lights to regulate the temperature within the display cabinet, as well as to display the donuts under generally full spectrum white light. The illumination of the donuts under full-spectrum white light improves their display appearance.

19 Claims, 10 Drawing Sheets

TOOL FOR APPLYING FLUID MATERIAL TO A COMESTIBLE PRODUCT

This application is a divisional application of U.S. Ser. No. 09/028,964, filed Feb. 24, 1998, now currently pending.

BACKGROUND OF THE INVENTION

1. Field of the Invention

The present invention relates to an improved method and apparati for preparing and displaying dough-based products.

2. Description of Related Art

Consumers throughout the U.S. and Canada, and increasingly throughout other parts of the world, have developed an affinity for donuts. While traditionally a morning food in conjunction with beverages such as tea or coffee, donuts have become a popular snack item that can be consumed at virtually any time of the day. In fact, many shops that manufacture and sell donuts continue to extend their operating hours in order to accommodate the public's around-the-clock demand for fresh donuts.

Concurrently, the popularity and number of convenience-type markets/stores, as well as quick-service restaurants, has also increased over the past decades. These types of retail establishments generally cater to consumers who desire food that can be prepared quickly and/or consumed in the vicinity of the retail establishment, especially during early morning and late night hours when traditional restaurants and grocery stores are closed. Convenience stores typically stock a number of staple items such as milk, cheese, coffee, soda, beer and snack foods, and also sell a wide variety of prepackaged foods that are refrigerated or frozen, and that can be quickly prepared in microwave ovens on the premises or at home. Quick-service restaurants offer a limited menu and are designed to allow workers to prepare and serve food quickly.

Space limitations and preparation requirements in convenience stores and in quick-service restaurants are important considerations in the determination of whether to offer a given line of food products or menu items. Food products that require an extensive amount of equipment or preparation by store personnel often do not generate sufficient revenues to offset the necessary space and/or required personnel expense.

In the case of "fresh-baked" goods, such as donuts and pastries, the considerable equipment and trained personnel required for commercial production of these products virtually prohibits their production in a convenience store or a quick-service restaurant environment. With respect to donuts, the cooking processes involve measuring ingredients, mixing dough, shaping the dough, allowing the dough to rise, deep-frying the donut dough in extremely hot oil and topping and/or filling the cooked donut. Especially with respect to the use of large quantities of extremely hot oil, these operations require extensive equipment and a number of specially trained personnel, both of which are commonly absent in the typical convenience store or quick-service restaurant.

One solution to these space and personnel limitations has been to prepare donuts and other such pastry products off-premises and then shipping these products to the convenience store for display and sale. However, there are a number of disadvantages inherent to such off-premises production and shipment of "fresh-baked" goods. Most significantly, "fresh-baked" products have an extremely limited shelf-life after production. With respect to donuts, after only a few minutes the donut begins to cool. Subsequently, the outer crust of the donut dries and hardens, and after several hours the donut is usually stale and offers little consumer appeal. Heating the donut for an extended period of time during display also increases the speed at which the donut dries and hardens, further shortening the already limited shelf-life of the donut. Conversely, refrigeration of the finished donuts may extend the shelf life, but almost immediately eliminates the hot "fresh-baked" quality desired by consumers. In addition, as a result of their extremely limited shelf life, those donuts not sold within a few hours of manufacture and/or shipment are typically discarded. These problems are exacerbated where preservatives are not used in the production of the donut.

Another problem associated with off-premises production and shipment of finished donuts is the inflexibility of this procedure to fluctuations in demand. The retailer must estimate donut sales at least a day, if not more, in advance of the actual shipment date from the manufacturer. Moreover, in order to accommodate unanticipated consumer demand, the retailer is forced to order an amount of donuts exceeding this estimate. However, if actual sales do not meet these estimates, as is often the case, the unsold donuts must be discarded, as they cannot be stored for later sale and usually cannot be returned to the manufacturer for credit.

Finishing the donuts also is a learned art. For instance, the process of glazing a donut requires a skilled artisan. The "glazer" uses a tool similar to that shown in FIG. 1. The tool includes a pair of hinged walls that pivot to vary an opening formed at the lower end of the walls. A reservoir is formed between the walls when the lower ends of the walls are brought together. A spring normally biases the walls into this position.

The glazer fills the tool with glaze by opening the lower ends of the walls and dipping them into a bath of glaze. The walls are closed to capture a volume of glaze between the walls in the reservoir. The glazer then passes the tool over a rack of donuts while allowing the glaze to flow from the lower end of the tool and coat the donuts.

The tool is awkward to use, however, and only after extensive experience can the glazer produce a smooth flow of glaze from the tool in order to evenly coat the donuts. The tool, when used by unskilled or less experienced employees, typically produces an uneven flow of glaze which tends to "collect" at various points along the tool's lower end, as illustrated in FIG. 1. Only by holding open the walls by a desired amount, by tilting the tool by a desired degree, and by slinging the tool at a particular acceleration across the rack of donuts can the skilled glazer produce an even flow of glaze from the tool. This learned combination of simultaneously performed motions requires extensive experience to master.

Glazing donuts in convenient-type stores or quick-service restaurants thus becomes impractical using the prior tool because of the high degree of skill required to use the tool and the relatively high turn-over rate of employees who work in such stores. Accordingly, such finishing steps have previously been performed at a centralized facility or a dedicated donut shop that produce a volume of donuts sufficient to justify employing a skilled glazer.

SUMMARY OF THE INVENTION

An aspect of the present invention involves a method and associated apparati for producing dough-based products (i.e., products comprising a mixture of flour or meal, liquids, and other ingredients) so as to have a "fresh-baked" quality at the point of service utilizing convenience store or quick-service restaurant equipment. For example, frozen donuts from a centralized manufacturing facility, which are either pre-cooked or par-cooked (i.e., partially cooked), are stored at freezing temperatures at the retail location. Periodically, donuts are removed from frozen bulk storage and are placed on a tray, and a bag is sealed around the tray of donuts. The sealed bag, tray and frozen donuts are placed in a refrigerator, and the frozen donuts are allowed to thaw under refrigerated conditions. The sealed bag prevents the donuts from losing a substantial amount of moisture during the thawing and refrigeration periods, thus the donuts can remain under refrigerated conditions for extended periods of time with no substantial (i.e., appreciable) loss of moisture and/or product freshness. When desired, the donuts can be rapidly heated and finished, resulting in a fresh tasting donut.

In a preferred production process, the donuts are quickly heated by first removing the bag from an individual tray, and then placing the tray of donuts onto a standard conveyor-type oven or impinger oven that heats and/or browns the donuts. The heated donuts are then taken to a finishing table where toppings and/or fillings are applied. The finished donuts are then displayed in an illuminated cabinet at the point of service for sale to consumers.

Because the donuts utilized in the disclosed method are prepared and frozen at a central manufacturing facility, the present method and apparati allows production of finished donuts using retail establishment equipment and personnel with minimal training. Simultaneously, the present method allows rapid heating and finishing of the donut at the retail location, thus quickly and conveniently attaining the "fresh-baked" quality desired by consumers. Because the pre-cooked or par-cooked donuts can be stored under refrigerated conditions for extended periods of time, small batches of donuts can be quickly finished as needed. The present method thus allows donut production to be tailored to local consumer demand, thereby limiting waste and allowing for increases and decreases in donut sales on an hourly and/or daily basis. In addition, the present method and apparati allows retailers to quickly and continually produce desired quantities of "fresh-baked" donuts during the day, thus ensuring the ready availability of "fresh-baked" donuts for the consuming public at all times. The present production process thus reduces wastage, increases retail flexibility, and allows for a continual supply of "fresh-baked" donuts through the day.

In accordance with another aspect of the present invention, a method of preparing a frozen dough-based product involves placing at least one frozen dough-based product on a tray, and then placing the tray of at least one frozen dough-based product in a container. The dough-based product is either pre-cooked or par-cooked before freezing. The container is sealed to isolate the frozen dough-based product from ambient air outside of the container. The container, tray and at least one frozen dough-based product are placed in a refrigerated environment. The frozen dough-based product is at least partially thawed with the container located within the refrigerated environment. After thawing, the at least partially thawed dough-based product is heated.

An additional aspect of the present invention involves a method of preparing a frozen dough-based product comprising placing the frozen dough-based product within an enclosed container. Again, the dough-based product is either pre-cooked or par-cooked before it is frozen. The enclosed container is placed within a refrigerated container in the proximity of a point of service. The frozen dough-based product within the enclosed container, however, is substantially isolated from the refrigerated air outside the enclosed container. The frozen dough-based product is at least partially thawed within the refrigerated, enclosed container, and the at least partially thawed dough-based product is then heated. Thereafter, the heated dough-based product is finished (e.g., with a topping or a filling) and displayed.

In accordance with another aspect of the present invention, a method of preparing an at least partially pre-cooked, frozen donut at the point of service, involves refrigerating a first enclosure and placing the frozen donut in a second enclosure. The frozen donut is thawed in the second enclosure with the second enclosure located within the first refrigerated enclosure. The second enclosure is sealed from the first enclosure. The thawed donut is removed from the second enclosure, and is heated. The donut is then finished and displayed.

A preferred method of applying a generally even layer of a fluid (i.e., flowable) material to an edible product (e.g., glazing a donut) involves placing the generally fluid material within a hopper of a culinary tool. The culinary tool is positioned above the edible product, and the hopper of the tool is oriented such that the fluid material flows through an opening on the hopper. A ledge is located at least partially beneath the opening such that at least a portion of the fluid material flows over the ledge. The culinary tool is held in a position to produce a flow of the fluid material from an elongated edge of the tool's ledge such that a generally even cascade of the fluid material falls from the elongated edge. By passing the culinary tool's ledge over the edible product, a generally even layer of fluid material is applied.

In one mode, the culinary tool comprises a hopper having an elongated shape and including an elongated slot formed along a lower portion of the hopper. A ledge is positioned beneath the slot and extends entirely across a width of the slot. The ledge is inclined relative to a flow axis through the slot.

In accordance with another aspect of the present invention, the finished donuts are displayed for sale in an illuminated display cabinet that utilizes two different types of artificial light sources. Because each type of artificial light source produces an incomplete spectrum of white light, the two sources together combine to nearly simulate a full-spectrum white light, which improves the appearance of the donuts. In addition, the positioning of the light sources in the cabinet permits the outer section of the display cabinet closest to the consumer to remain relatively cool to the touch while the inner sections of the cabinet (and thus the donuts) are warmed by heat generated by the second light source.

Further aspects, features, and advantages of the present invention will become apparent from the detailed description of a preferred production process and apparati which follows.

BRIEF DESCRIPTION OF THE DRAWINGS

The invention will now be described with reference to the appended drawings which depict embodiments of aspects and features of the invention. The illustrated embodiments, however, are intended to only illustrate and not to limit the invention. The drawings contain the following figures.

DETAILED DESCRIPTION OF THE PREFERRED PRODUCTION PROCESS AND ASSOCIATED APPARATI

The present method and apparati allows for the production and display of donuts (or other dough-based products) in a retail environment having the taste and appeal of "fresh-baked" donuts, while requiring little in the way of non-standard equipment or store personnel training. As most convenience stores already have freezers, refrigerators and conveyor-type ovens on-site, store personnel should already be familiar with the use of such equipment, and thus would require little additional training to produce finished donuts using the present method.

Figure 1:
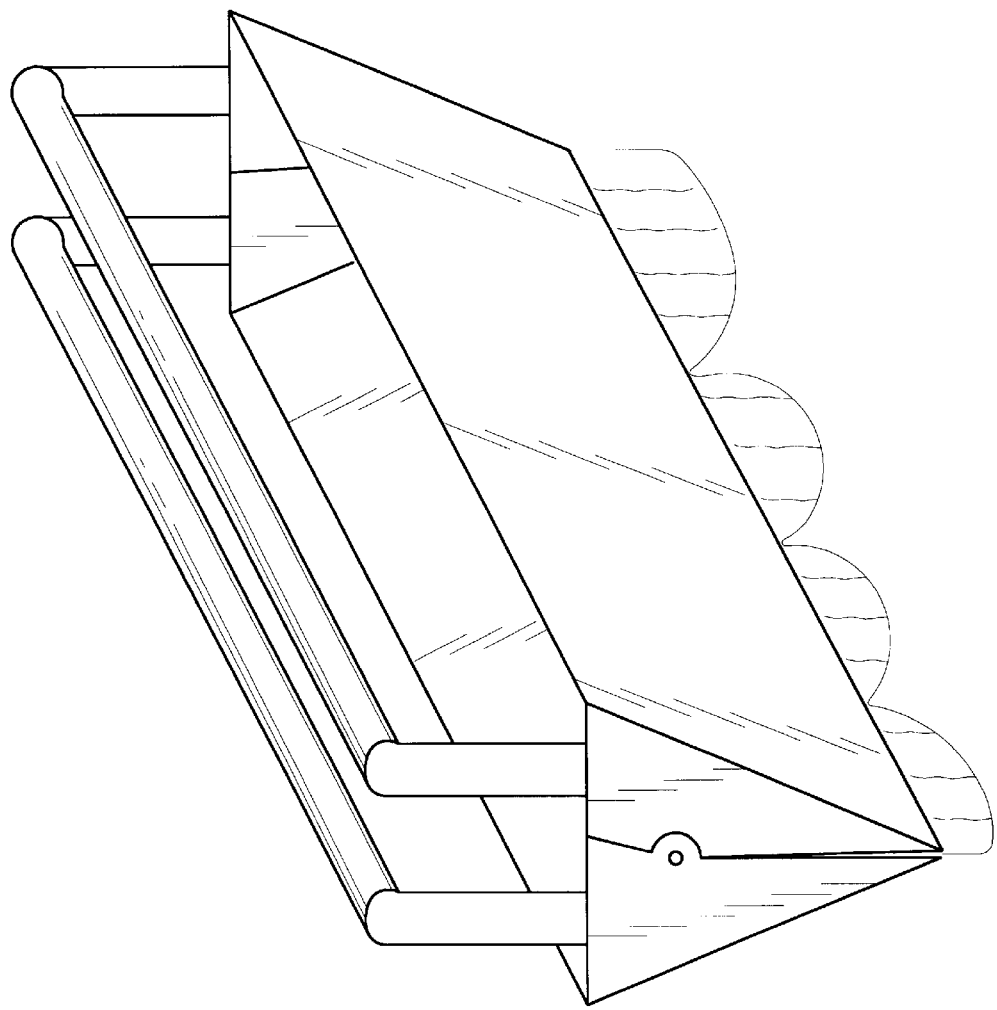
FIG. 1 is a perspective view of a glazing tool and schematically illustrates an exemplary flow of glaze from the tool when used by an unskilled worker.
Figure 2:
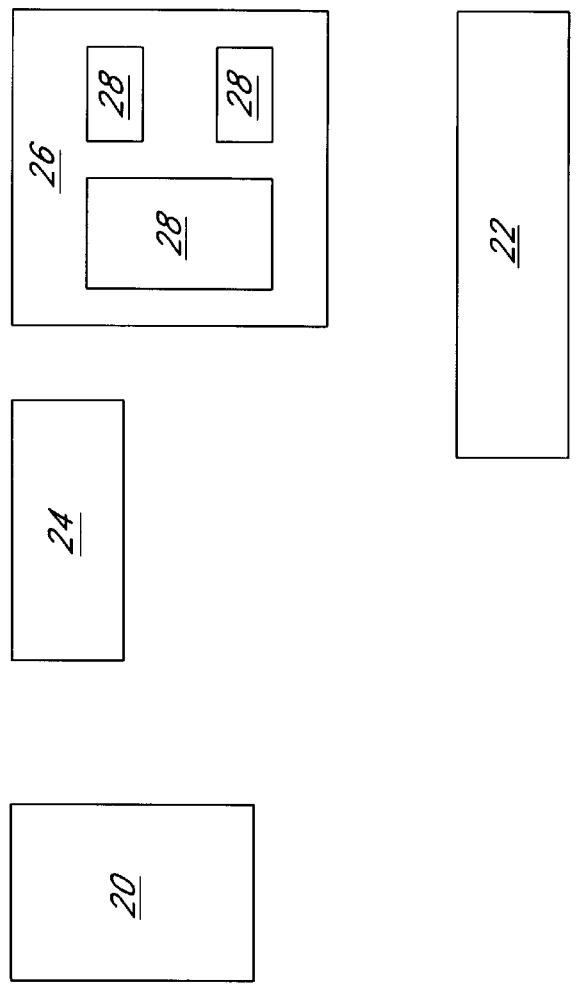
FIG. 2 schematically depicts a layout of an exemplary convenience type store showing various equipment used with the present production method.
Figure 2:
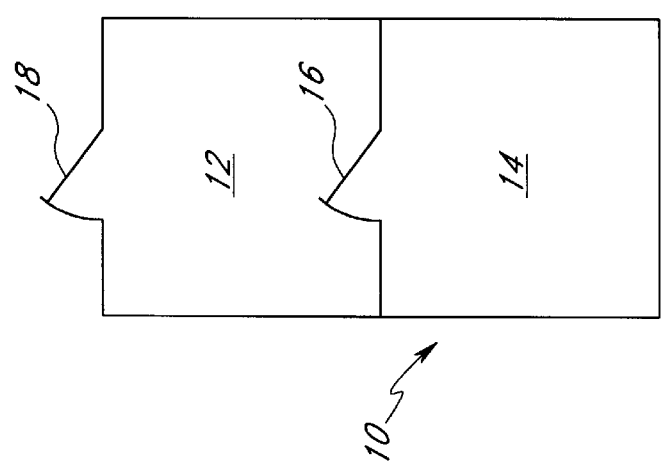

FIG. 2 depicts an exemplary layout of a section of a convenience-type store which includes the equipment utilized in the present production process. A walk-in cooler 10 is comprised of a refrigerator section 12 and a freezer section 14, separated by a door 16. An access door 18 enters into the refrigerator section 12. A second refrigerator 20 desirably is located closer to a conveyor-type oven 24 than is the refrigerator section 12. And the second refrigerator 20, the oven 24 and a finishing table 26 are advantageously located in close proximity to one another and to an illuminated display case 22. This arrangement provides an ergonomic and compact working environment. The finishing table 26 desirably incorporates one or more heated wells 28 that are used to warm pans of heatable toppings, such as, for example, glazes and frostings used in the finishing of the donuts, as explained below.

Figure 3:
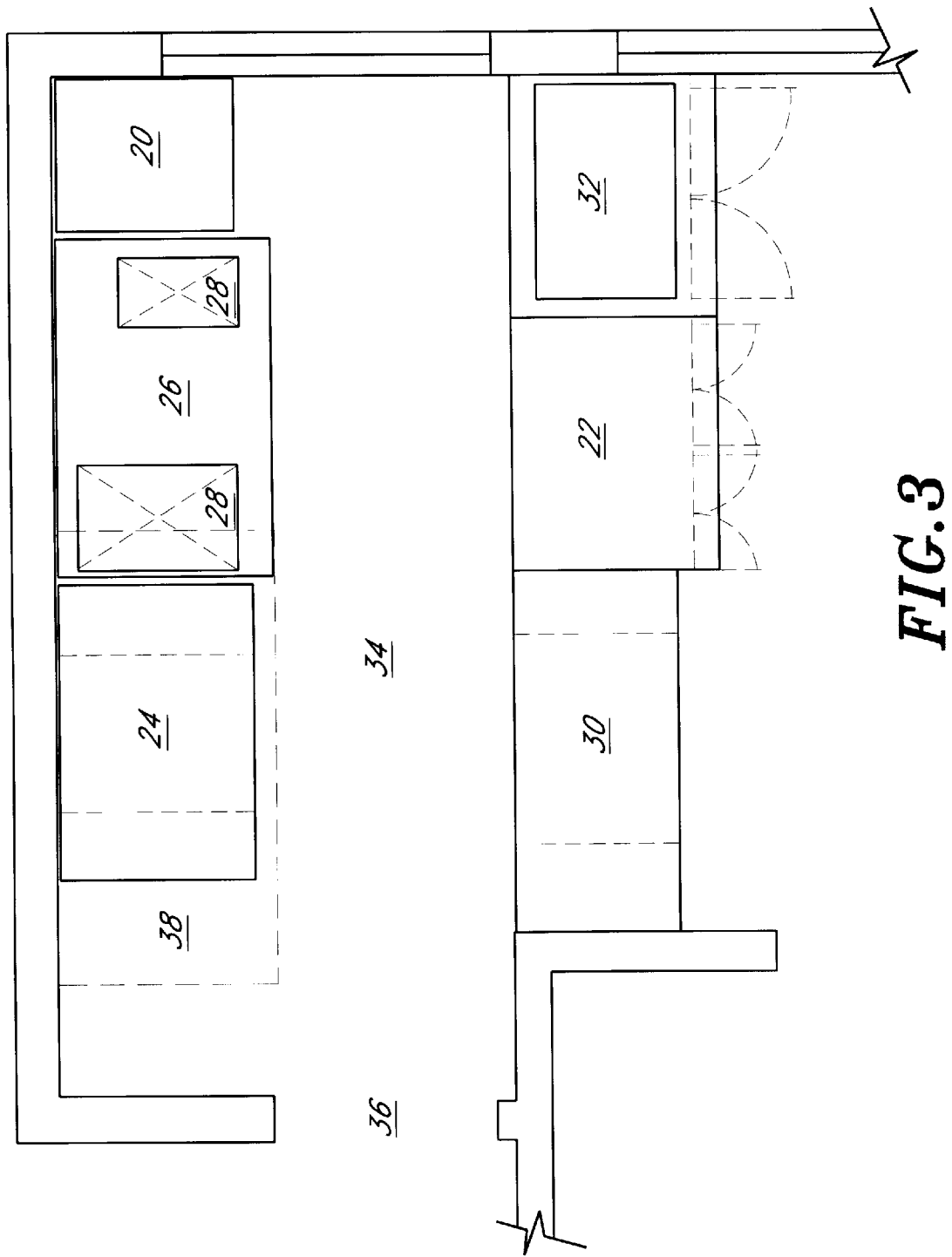
FIG. 3 schematically depicts another layout of an exemplary convenience type store showing various equipment used with the present production method.

FIG. 3 depicts another layout for a section of a convenience store environment which includes the equipment utilized in the present invention. This embodiment is particularly useful where the owner of the convenience store desires to consolidate the equipment utilized in the present invention and/or wishes to perform only minor structural alterations to the convenience store so as to accommodate the equipment used in practicing the present invention. Similar to the previously described layout of FIG. 2, the illustrated layout comprises an oven 24, a finishing table 26, a refrigerator 20, and an illuminated display case 22. An exhaust hood 38 is positioned over the oven 24, which draws heated air and/or exhaust fumes generated by the oven away from the work area 34. In addition, this layout provides for a counter 30 and a warmer 32. The counter 30, the display case 22 and the warmer 32 desirably form a partition which isolates customers from the work area 34 containing the oven 24, the finishing table 26 and the refrigerator 20. In this layout, the bulk frozen donuts are stored in a freezer (not shown) located elsewhere in the convenience store. Employee access to the work area 34 may be gained through a back entrance or doorway 36, or can be gained through various alternate means, including a hinged countertop (not shown), which is well known to those of ordinary skill in the art.

In a preferred mode of the present production process, the frozen donuts used in the disclosed method desirably are prepared at an off-site location. A typical preparation procedure producing frozen donuts suitable for use with the disclosed method is described below followed by a description of the on-site production process of the present method.

Preparation at a Centralized Manufacturing Facility

The initial preparation, cooking and freezing of donuts used in the present production process desirably occur in a centralized manufacturing facility. Donuts are traditionally made from a combination of flour, sugar, milk or buttermilk, eggs, shortening, salt, baking soda and baking powder. In addition, other ingredients, conditioners and/or preservatives may be added to the dough mixture to achieve desired results in taste, texture, consistency and/or product shelf-life. A typical recipe for donuts is:

| | |
|---|---|
| 57.8% | flour |
| 19.3% | sugar |
| 14.5% | buttermilk |
| 4.8% | eggs |
| 2.4% | shortening |
| 0.4% | salt |
| 0.4% | baking soda |
| 0.4% | baking powder |

The above ingredients are mixed together to form a doughy mixture, which may be refrigerated or chilled in order to thicken the dough, or allowed to relax at room temperature for easier handling. The dough is then flattened or sectioned and shaped into circular cakes or disc-shaped rings, which are subsequently deep-fried in a fryer containing oil at a temperature of approximately 350° F. to 415° F. During this deep-frying process, the donuts expand and rise to the surface of the hot oil, and are turned over to ensure even cooking on both sides. When the donut has been sufficiently cooked (typically to a golden brown color) it is removed from the oil and allowed to drain and dry. Alternatively, the donuts could be removed from the deep-frying process prior to becoming completely cooked, or could be partially cooked by baking and/or broiling. Such pre-cooked, partially-cooked (i.e., par-cooked) or par-baked products are equally well suited for use in conjunction with the present invention.

The donuts are then possibly allowed to briefly cool and are flash-frozen. Flash freezing can be used to quickly cool the donuts, provided that the flash freezing period is sufficiently short to avoid the total freezing of the donut, as excessive freezing can result in freeze shock to the donut and attendant loss of moisture. A typical flash-freezing unit is maintained at approximately −30° F., and the flash freezing of the outer strata of the donut locks in moisture. The surface layer of the donut will typically be frozen approximately 3 to 5 minutes after initial exposure to the intense cold in the flash-freezer.

Of course, other freezing methods are possible. For example, the flash freezing process may be controlled by a time controlled liquid nitrogen bath. Or the donuts can be frozen in a more conventional manner by placing the donuts in a freezer. In connection with this approach, the freezer preferably is maintained at a temperature between 10° F. to −25° F., and it will take between 25 minutes and 1 hour to freeze the donuts, dependent on the quantity of donuts and the size and type of freezer. The donuts, when frozen, should have a core temperature of 0° F. to −5° F. to maintain optimum freshness.

Once frozen, the donuts are then quickly packaged in bulk lots and sent to a freezer unit (maintained at a temperature between 10° F. and −25° F. ). Because donuts in a frozen state are sufficiently rigid and strong enough to support many times their own weight, multiple layers of donuts can be stacked upon each other without fear of collapse or distortion. This greatly simplifies packaging, allows greater numbers of donuts to be packed closer together, and obviates the need for substantial packing support, thereby reducing the weight and size of packaging necessary for bulk donut transport. Of course, lightweight cardboard partitions or other such packing supports can also be used to provide minimal support and protection for the frozen donuts without adding significant weight or bulk to the donut packaging.

The bulk donuts should be contained in air-tight bags or other such containers during frozen shipment and storage in order to avoid the possibility of "freezer burn" during shipment and storage, caused by loss of moisture in the donuts while frozen. The bulk lots are then shipped to individual retail locations.

Product Process at Point of Service

Figure 4:
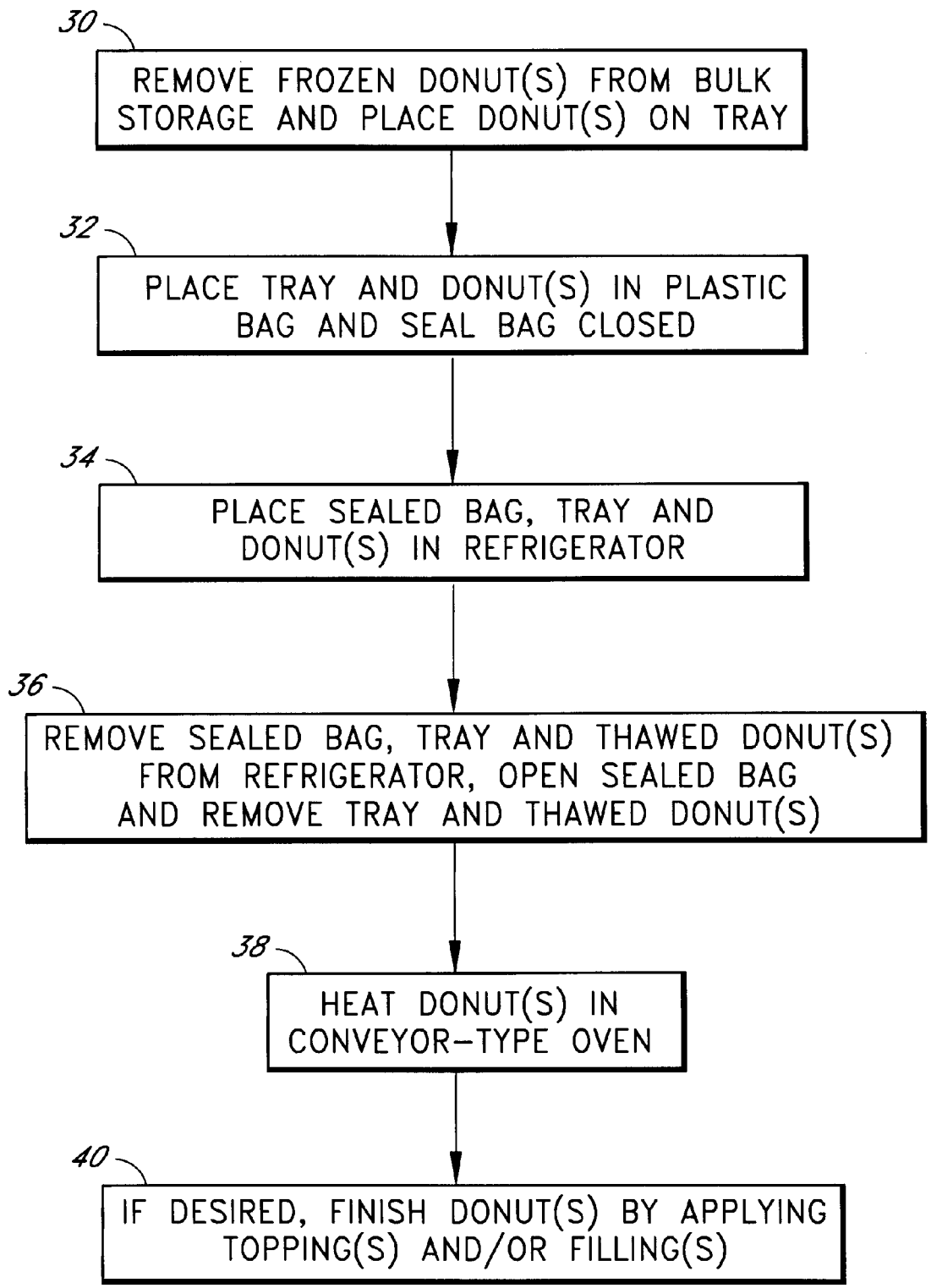
FIG. 4 depicts a flow chart diagraming the acts of a production process practiced in accordance with a preferred mode of the present invention.

The present production process will now be described in connection with FIGS. 2 and 3, which illustrate exemplary retail store layouts, and FIG. 4, which illustrates the general acts involved with the present on-site production process. At a retail location, the bulk frozen donuts are stored in the freezer 14 or other frozen storage container. The retailer desirably estimates the anticipated sales of donuts over the next few days, and removes a corresponding number of frozen donuts from the freezer 14. These frozen donuts are placed on trays with sufficient separation to allow each donut to slightly expand during the thawing and heating processes without contacting the edges of the tray and/or other donuts on the tray (as represented by operation block 30 of FIG. 3). It is anticipated that approximately one dozen average-sized donuts will fit on a standard 15 inch by 18 inch tray.

The tray desirably is heatable so that a single tray is used during both the thawing and heating stages of the production process. Such a heatable tray may also be sized to be used in an illuminated display case and/or food warmer, thereby further reducing the number of times the donuts are handled during the production process. In an exemplary embodiment, the tray is a conventional aluminum alloy tray suitable for use with food and in ovens.

Each tray of donuts is then placed into a container or enclosure and the container or enclosure is sealed with a substantially air-tight seal (operation block 32). The container or enclosure could be used without the tray; however, the production process would then require an extra act of removing the donuts from the container once thawed and placing the donuts on a tray or other suitable article (paddle, stone, etc.) for placing in the oven 24, as described below. By using the same tray during both the thawing and heating steps, the process gains efficiency.

In an exemplary embodiment, the enclosure or container is a bag. The bag can be constructed of plastic, metal foil, or coated paper, or can be of any other material that will allow the exchange of thermal energy (i.e., heat) through the bag while providing a barrier to moisture so as to inhibit a substantial loss of moisture from the bag's interior. Other types of containers or enclosures of course can also be used to substantially isolate air in contact with the donuts from the refrigerated air. Such alternative containers and enclosures include, but are not limited to, glass, Tupper-ware™, plastic wraps, metal foil wraps, or the like.

In the illustrated example, the bag is sealed by twisting the end of the bag and securing the twisted end with a conventional bag tie. Clips or other conventional closures can also be used to seal the bag closed, or the bag end can simply be tied closed. The resulting seal desirably inhibits leakage of moisture from the interior of the bag.

The sealed bag and tray are then placed in a refrigerated environment (operation block 34), and preferably are maintained between 38° F. and 45° F. In the embodiment of FIG. 2, the trays of donuts desirably are placed within the second refrigerator 20 which is located near the oven 24. This location shortens the path from the refrigerator to the oven, thereby furthering the production process's efficiency. However, lack of space or capital for equipment may dictate that the production line cannot include the second refrigerator 20. Under such conditions, the "panned" donuts can be placed in the conventional walk-in refrigerator 12.

While in the refrigerated environment, the frozen donuts thaw. In the preferred embodiment, the donuts will completely thaw in less than six hours. Alternatively, the donuts may thaw more slowly, completely thawing in less than eighteen hours. Of course, depending upon the initial temperature of the frozen donuts and the refrigeration temperature, the frozen donuts could take upwards of 36 hours to completely thaw.

During the thawing process, the relative humidity of the air in the sealed bag will tend to reduce due to the rise in temperature. As a result, some of the internal moisture in the donuts will transfer to the air in the sealed bag due to evaporation, and/or migration. Because the bag substantially isolates this moist air in contact with the donuts from the drier air within the refrigeration compartment, however, moisture from the moist air inside the bag will not transfer to the drier refrigerated air, and thus the donuts will not continually lose a significant amount of moisture while in the refrigeration unit. This results in a moister donut that can be refrigerated for extended periods of time without fear of drying-out or hardening of the donut due to reduction in the donuts' moisture content. Thus the retailer can stockpile a supply of "ready-to-prepare" donuts that will remain fresh and moist, even if not immediately used. Preferably, a large number of such trays are prepared and placed in the refrigeration unit 20, in preparation for consumer demand.

When the retailer determines that fresh donuts are required for display and/or sale, store personnel remove one or more sealed bags and trays from the refrigerated environment, and remove the tray(s) from the sealed bag(s) (operation block 36). Each tray will then be placed on the belt of the standard conveyor-type oven 24, where the donuts are exposed to a heat source that quickly warms the donut (operation block 38). Alternatively, the donuts can be heated utilizing alternate heat sources such as, for example, an impinger oven, resistance heaters, natural gas, steam or microwaves, among other known heating sources. The brief heating process heats the donut and warms the donut's core, and possibly "browns" the donut's surface. The donuts desirably are heated to an internal temperature of about 160° F. to about 180° F. during the heating operation. This process produces a "fresh-baked" aroma and crispy surface texture typical of a "fresh-baked" donut. In the preferred embodiment, this rapid heating process takes less than 90 seconds using an impinger type oven to completely warm and/or to finish cooking the donuts. Alternatively, the heating process may take less than five minutes. Of course, the heating process may take longer than five minutes in some applications, depending upon the temperature of the heating device and/or how thoroughly the donut has been thawed prior to heating.

If desired, the heated donuts can then be taken to the finishing table 26, where edible toppings and/or fillings are applied to the donuts (operational block 40). In the embodiment disclosed in FIG. 5, the finishing table 26 comprises a flat work area 40 with a glazing station 42 and an icing station 44 disposed in heated wells 28 therein. The heated wells 28 heat the glazing station 42 and icing station 44 in a manner well known to those of ordinary skill in the art.

The icing stations are composed of one or more dishes 58 that fit into the heated well 28 in the work area 40 of the finishing table 26. For frosting, the store personnel spreads icing on the donut using a spatula and/or places the hot donut directly into the frosting. The icing desirably is heated in a pan on the finishing table 26 in order to ease the icing process. Once frosted or glazed (in the manner described below), or apart from the glaze or frosting, the personnel can apply other toppings (e.g., sprinkles, powdered sugar, flaked coconut, nuts, confections, and the like) to the donuts. In addition or in the alternative to applying toppings, the personnel can fill the donuts with fillings, such as, for example, creams, frostings, puddings, jellies, jams, cheeses, and similar comestibles.

The glazing station 42 comprises a flat grating 50, an inclined shallow well 52 and a collection area or deep well 54. The grating 50 rests on projections 56, which suspend the grating above the surface of the shallow well 52. The surface 58 of the shallow well 52 is angled such that a glaze topping (not shown) in contact with the surface 58 will tend to flow towards and collect in the deep well 54 due to gravitational forces.

Figure 5:
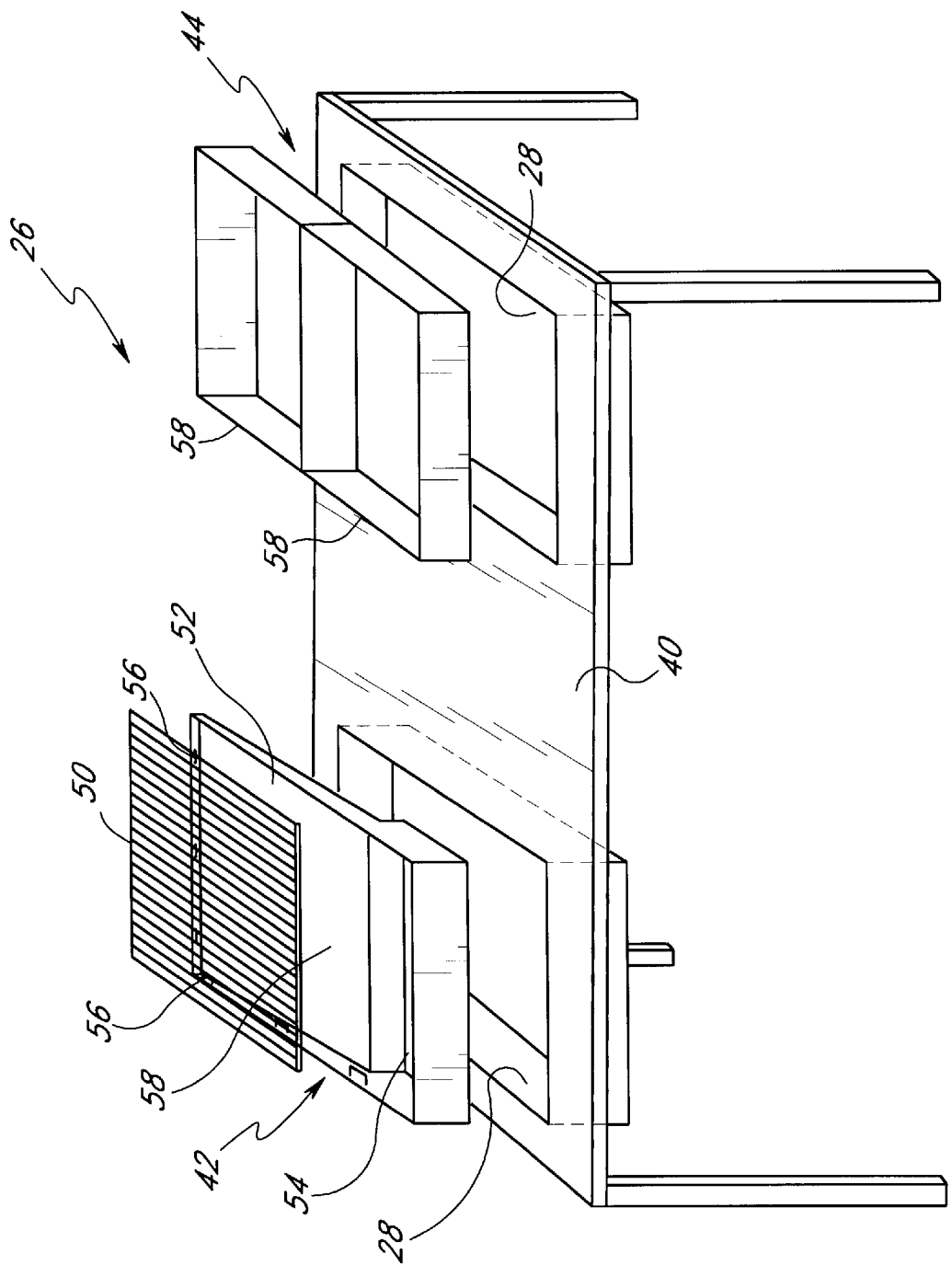
FIG. 5 shows an exploded front perspective view of a finishing table configured in accordance with an embodiment of the present invention.

A culinary tool desirably is used to apply a generally even coat of glaze to the donuts. In the illustrated embodiment, a topping applicator 60, which is depicted in FIGS. 5 and 6, is used for this purpose.

Figure 6:
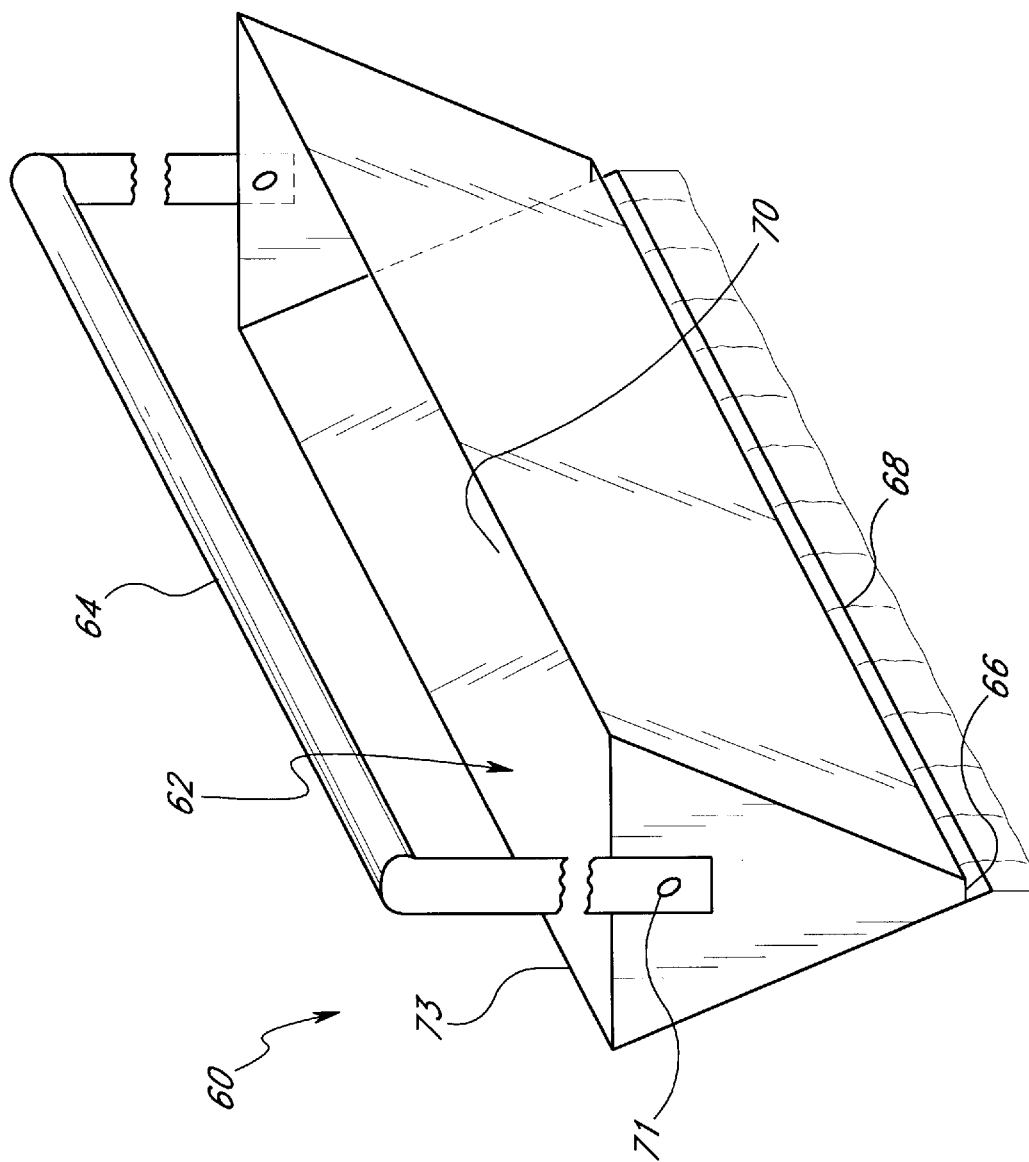
FIG. 6 shows a side perspective view of an applicator configured in accordance with an embodiment of the present invention.
Figure 7:
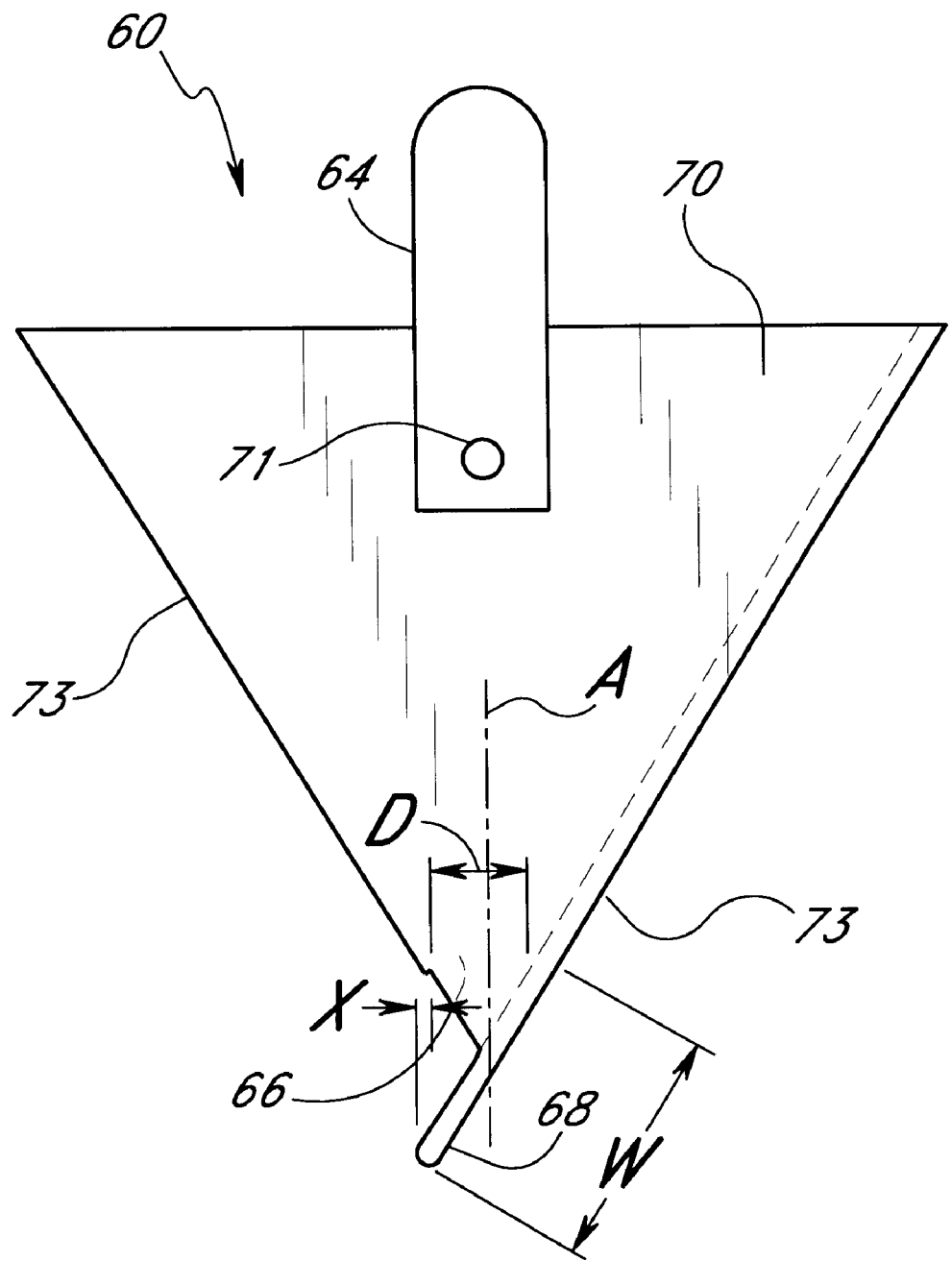
FIG. 7 shows an end view of the applicator of FIG. 5.

As seen in FIGS. 6 and 7, the topping applicator 60 desirably comprises an open-ended hopper 70 that is connected to a handle 64 by bolts 71 or like means. In the illustrated embodiment, the handle 64 is pivotally connected to the hopper 70 to permit relative movement between these elements. The hopper 70 desirably includes a pair of converging wall sections that together define an opening or slot 66 along the lower ends of the wall sections. In the illustrated embodiment, the hopper 70 has a generally V-shape or triangular shape in cross-section defined in part by a pair of converging, longitudinally extending walls 73. The slot or opening 66 is formed at the lower ends of the walls. Of course, the hopper 70 can be formed in other shapes, provided that the hopper include tapering or funneling structure located next to the opening or slot 66.

The slot 66 desirably has a sufficient width D to permit the fluid material (e.g., donut glaze) to flow from the bottom of the hopper 66, and is significantly smaller than upper opening of the hopper 70. In the illustrated embodiment, the slot 66 has a width D of about ¼ inch; however, as will be readily apparent the slot 66 can be wider or narrower depending upon the consistency (i.e., viscosity) of the fluid material being dispensed and upon the desired thickness of the applied layer.

A ledge 68, extending from one of the walls 73 of the hopper 70, projects below the lower opening 66. The ledge 68 is inclined relative to a flow axis A through the slot opening 66, as best seen in FIG. 7. In the illustrated embodiment, the ledge 68 and the adjoining wall 73 are unitary and generally coplanar. The ledge 68, however, can be formed separately and need not be coplanar, or even parallel. The ledge 68 though is desirably inclined and extends completely across the width D of the slot 66 at a point below the slot opening 66. More preferably, the ledge 68 extends beyond the distal side edge of the slot opening 66, as represented by distance X in FIG. 7, such that any fluid material dripping from the distal side edge will tend to fall upon the ledge 68 before being applied. In the illustrated embodiment, the ledge has a width W (see FIG. 6) equal to about ¾ to 1 inch. This results in a degree of ledge overhang X. The degree of overhang X desirably is smaller than width D of the slot 66 in the exemplary application for safety concerns; however, it is understood that the degree of overhang can be readily tailored by those skilled in the art to suit a particular application. The degree of overhang X, however, should not be too large because a large surface area on the ledge 68 will increase friction (i.e., surface tension) between the fluid material and the surface of ledge over which the fluid flows. Too much friction (i.e., surface tension) will interfere with the smooth flow of the fluid material from the ledge 68.

As best seen in FIG. 6, the hopper 70 has an elongated shape. The slot 66 and the ledge 68 also have elongated shapes and are generally coextensive with the length of the hopper 70. The ledge 68 also defines a substantially straight lower edge at an outer end of the overhang. The handle 64 also extends the length of the hopper 70 in the illustrated embodiment.

For glazing, the store employee will remove the donuts from the tray, and place them on the grating 50 of the glazing station 42. The employee will then fill the hopper 70 of the applicator 60 by submerging the top opening 62 of the hopper 70 in the glaze (not shown) located in the deep well 54. The pivotal handel 64 allows the employee to lay the hopper 70 on its side during this procedure while still grasping the handle 64 from a point above the well 54. Of course, the applicator 60 could also be filled by alternate means, such as an automated and/or continuous feed mechanism that pumps glaze or other toppings into the hopper 70.

When the applicator 60 is filled, the employee lifts the applicator by the handle 64 and positions the applicator 60 above the donuts on the grating 50. The hopper 70 is oriented in a generally upright position such that glaze will then begin to pass through the lower slot 66 of the applicator and down along the inclined ledge 68, subsequently falling off the ledge towards the deep well 54. Within a few seconds, the flow of glaze will become a relatively constant laminar sheet. That is, the glaze flows from the longitudinal edge of the ledge 68 to produce a generally even cascade. The employee can then pass the applicator 60 over the donuts and grating one or more times, depending upon the desired glaze thickness.

When glazing is completed, the employee returns the applicator to the deep well and removes the donuts from the grating. Because the donuts are placed on the grating, located above the inclined shallow well, any glaze that does not adhere to a donut will be recycled into the deep well for use in subsequent glazing operations.

The present applicator 60 facilitates an even application of glaze layer to the donuts. The design of the applicator 60 permits the glaze to pass through the lower opening 66 and completely separate from the opposing lower ends of the walls 73 before it is applied. Any capillary action in the glaze that inherently occurs (and normally causes the glaze to collect or clump) as it passes through the opening 66, does not affect the smooth flow of the glaze. Rather, glaze from the distal edge of the opening 66 drips onto the ledge 68 and then smoothly cascades from the ledge's lower edge. Because there is only a single solid surface (the ledge 68) to which the glaze can adhere as it begins falling, the glaze flows smoothly from the edge. This results a smooth "sheet" of cascading glaze, as shown in FIG. 6, which is passed over the donuts one or more times, thereby quickly and consistently coating the donuts with a desired thickness of glaze with minimum effort. In addition, the disclosed applicator 60 can be used to dispense numerous other diverse fluids such as, by way of example and not by way of limitation, pizza sauce, liquified cheese or glycerine.

Because the application of the present invention requires little operator expertise to produce a smooth sheet of glaze, it greatly simplifies the glazing operation. As opposed to the prior art glazer, which required an operator having extensive experience in glazing operations, the present invention can be utilized by relatively unskilled personnel, who will now be able to quickly and efficiently glaze donuts with little or no training in the use of the applicator. Because convenience store and quick-service restaurant personnel commonly have little or no experience with glazing donuts, the present invention obviates the need for specially trained personnel, and greatly simplifies the finishing process at the point of service.

Figure 8:
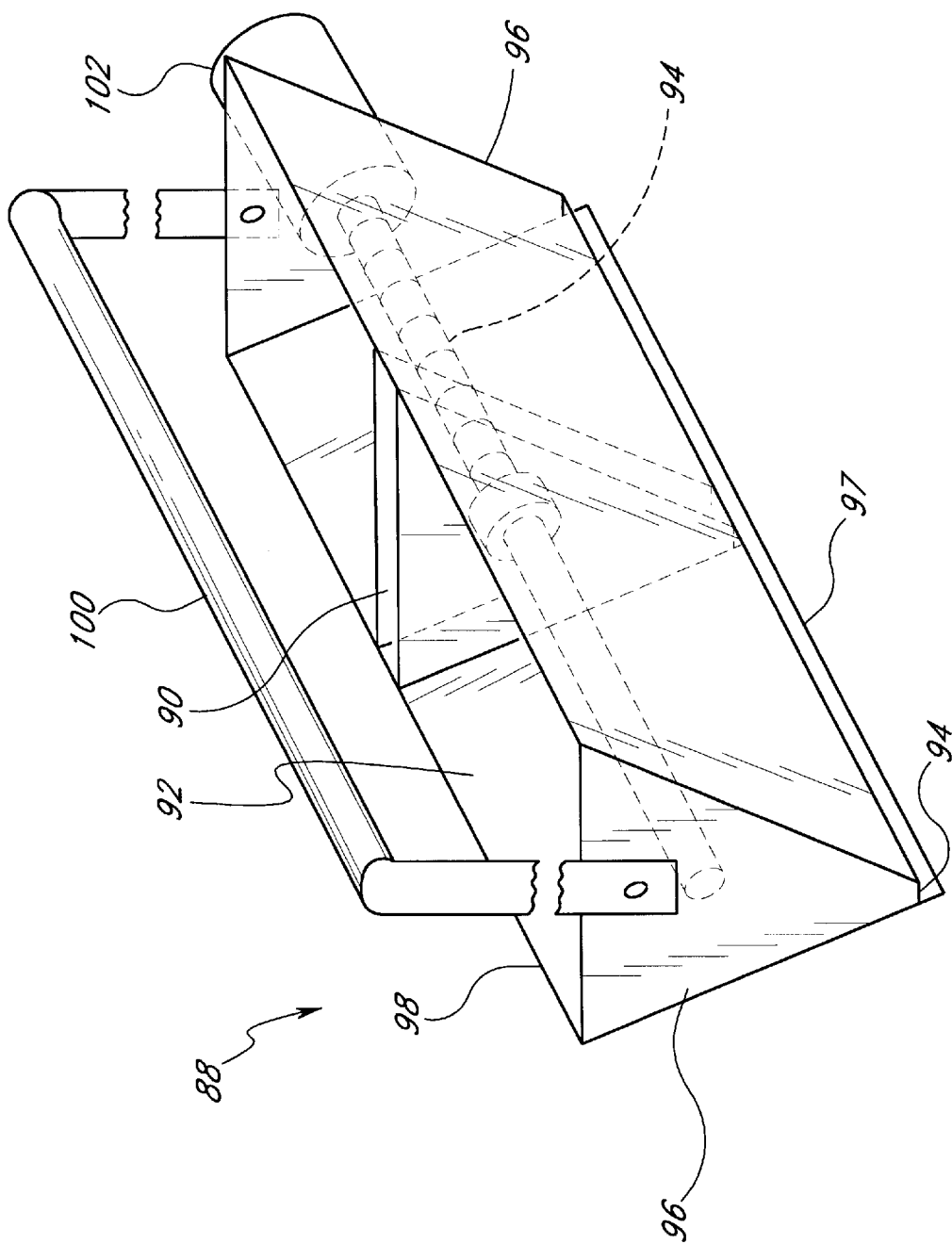
FIG. 8 shows a side perspective view of an applicator configured in accordance with another embodiment of the present invention.

FIG. 8 shows a modified applicator 88, constructed in accordance with another embodiment the present invention. The applicator 88 includes a moveable insert 90 that slides longitudinally along a triangular-shaped hopper 92, which is configured in a substantially similar manner to that described above. Accordingly, the above description of the applicator should apply equally to the present embodiment, unless indicated otherwise.

The moveable insert 90 is positioned on a cylindrical rotating shaft 94, which is rotatably secured to at least one sidewall 96 of the applicator 88. The exterior surface of the shaft 94 is threaded, which cooperates with the internally threaded bore 96 of the insert 90 in a manner well known in the art, such that rotation of the shaft 94 will move the insert 90 along the longitudinal axis of the applicator 88. At the bottom of the hopper 92 is a lower opening 94 through which a glaze or other topping (not shown) may pass. An inclined ledge 96, formed by extending one of the walls 98 of the hopper 92, projects below the lower opening 94 such that, when the applicator is held by the handle 100, the topping passing through the lower opening 94 will contact the inclined ledge 97 prior to falling off the applicator. Attached to the rotating shaft 94 is a motor 102, which rotates the shaft 94 in response to an external input (not shown), thereby positioning the insert 90 in a desired longitudinal position. By moving the insert 90 to a desired location, the operator can effectively alter the longitudinal or effective length of the lower opening 94, thereby increasing or decreasing the span of the dispensing stream, as desired.

When coating a circular product surface, such as, for example, but without limitation, coating a pizza crust with a sauce, it is desirable that the sauce evenly coat substantially the entire crust, but leave the periphery of the crust uncoated. The uncoated periphery will, after sufficient baking, result in a crispy outer crust that can easily be gripped by the consumer.

Figure 9:
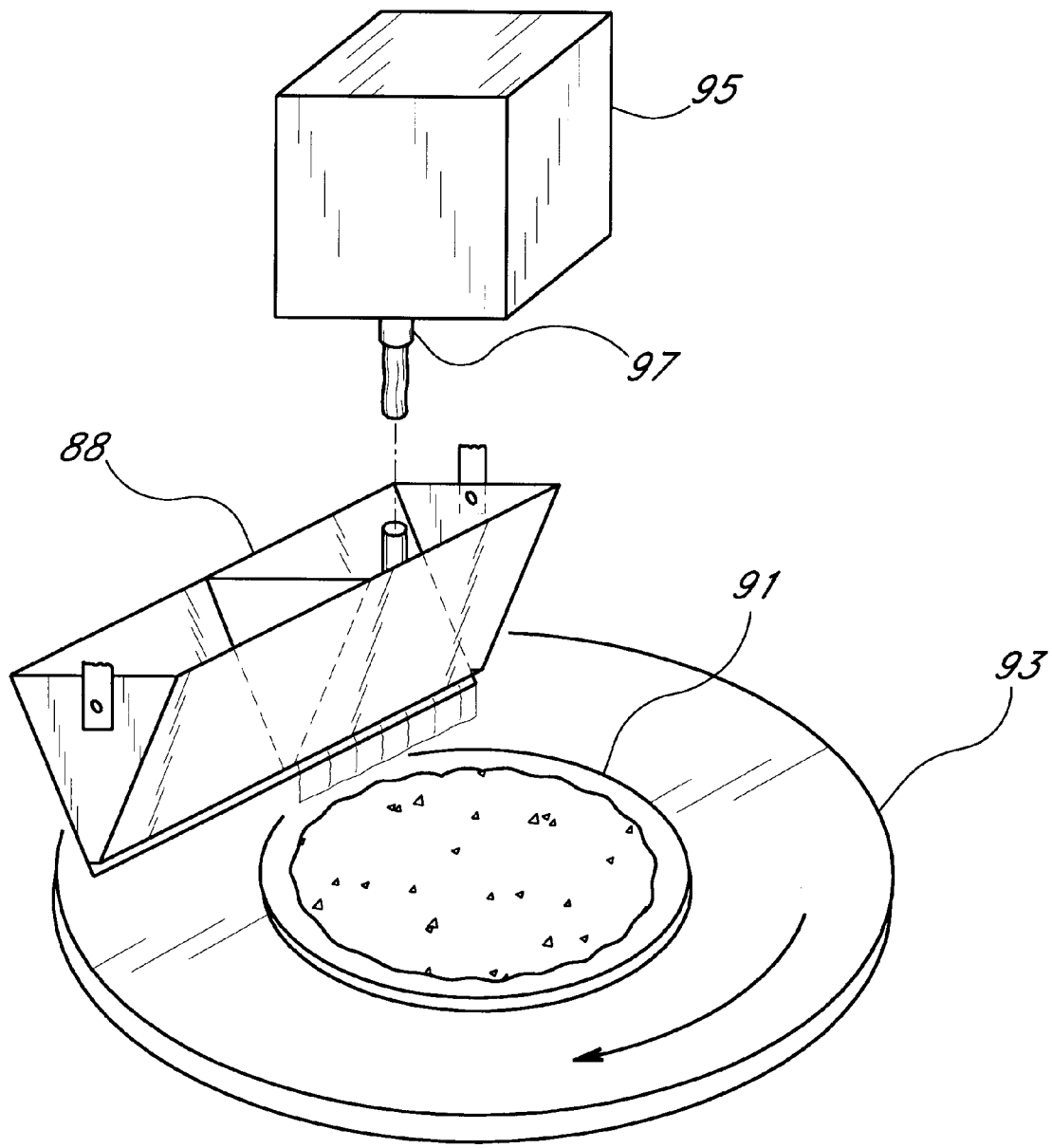
FIG. 9 schematically shows an exploded view of an application of the applicator of FIG. 8 used with a rotatable working surface and a controlled dispensing unit.

The embodiment disclosed in FIG. 8 is particularly well adapted for use in the automated coating of circular work surfaces, such as pizza crusts or other dough-based products. For instance, FIG. 9 depicts an exploded schematic representation of a rotary pizza coater, in which the applicator 88 is suspended above a pizza crust 91 positioned on a rotating work surface 93. One end of the applicator 88 is located above the center of rotation of the rotating work surface, with the opposite end extending outward. In order to evenly coat the pizza crust 91 with sauce, the applicator 88 can be held in a fixed position while the pizza crust 91 is rotated beneath, or vise versa. A controlled pumping device 95, such as the one disclosed in U.S. Pat. No. 5,553,740 to King et al., which is hereby incorporated by reference, supplies a predetermined quantity of sauce to the applicator 88 through a supply tubing or nozzle 97.

During a coating operation, the pizza crust 91 is placed on the rotating work 5 surface 93. The work surface is then rotated manually, or can be rotated by other means such as an electric motor. If necessary, the longitudinal position of the insert can be adjusted (either manually or automatically), thereby increasing or decreasing the effective length of the slot opening to generally match the radius of the pizza pie. The controlled pumping device then dispenses a predetermined quantity of pizza sauce into the applicator 88, which evenly spreads and distributes the sauce onto the pizza crust, thereby efficiently automating a portion of the pizza-making process previously accomplished manually.

Displaying the Finished Product

After finishing a donut, the store personnel places the donut on a display tray which is preferably lined with a suitable liner (e.g., wax paper). The finished donuts are then presented for sale in the illuminated display cabinet 22.

It is well known that food appears most natural when displayed under natural or "white" light, which is light that contains the entire spectrum of visible light frequencies. However, most common light sources used in the food service industry, such as incandescent bulbs or fluorescent-gas discharge tubes, produce only a portion of the visible light frequencies, thus causing certain colors of food displayed by these sources to appear dull or "washed out." While it is possible to produce white light using a single artificial light source, such sources are expensive and often difficult to maintain, which generally prohibits their use in a food service environment.

One of the most commonly used light sources in the food service industry are fluorescent-gas discharge tubes, otherwise known as fluorescent lights, which produce light with a substantial ultraviolet component. A drawback of this light source is that food items having substantial red and/or yellow colors appear dull or washed-out under fluorescent illumination, rendering these food items less appetizing to the average consumer. The other most commonly used light source, incandescent bulbs, generate light having a substantial infra-red component. A drawback of this light source is that food items having substantial blue or green colors appear somewhat dull and unappetizing under incandescent illumination.

In order to overcome the significant drawbacks of each lighting type, one embodiment of the present invention utilizes incandescent and fluorescent light sources, in conjunction, to produce an artificial illumination that closely approximates natural or white light. Because incandescent and fluorescent lights each dominate one end of the visible light spectrum, respectively, each type of light will compliment the other, thereby producing a more natural white light with minimal expense, and displaying food items in their best possible "light."

A further advantage of the disclosed embodiment results from the different operating temperatures of incandescent and fluorescent lights. It is well known that fluorescent-tube lights generate much less waste heat during operation than their incandescent counterparts. In fact, fluorescent lights typically generate at least 2½ times less waste heat than their equivalent incandescent counterparts. By properly positioning the fluorescent lights (a cold lighting source) and the incandescent lights (a hot lighting source), it is possible to utilize the waste heat generated by the incandescent lights to warm displayed food items while isolating consumers from hot surfaces in the display cabinet.

Figure 10:
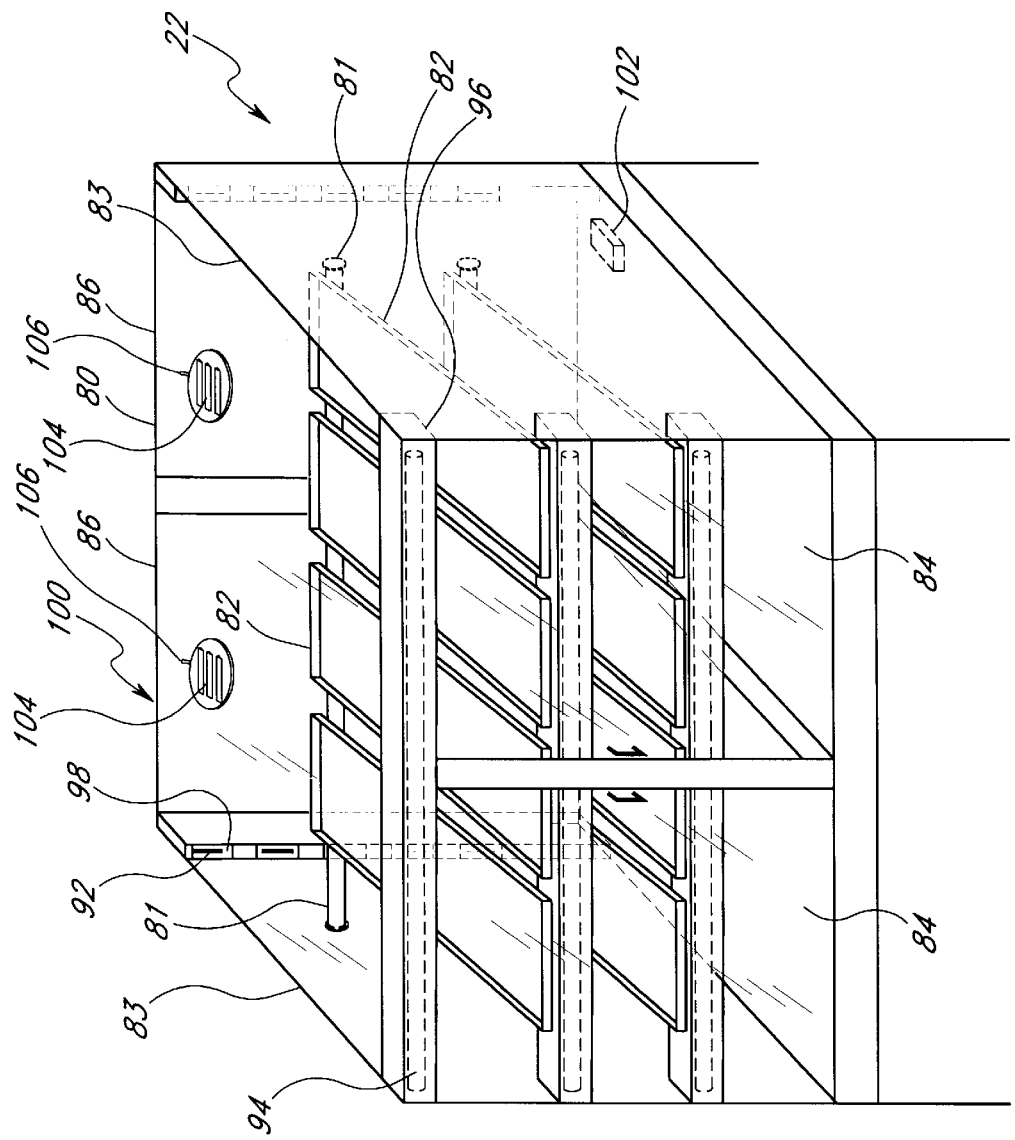
FIG. 10 shows a front perspective view of a display cabinet configured in accordance with a preferred embodiment of the present invention.

FIG. 10 shows an illuminated display cabinet 22 constructed in accordance with an embodiment of the present invention. The cabinet 22 comprises a display box 100 having an interior space which is viewable through an upper transparent surface and through a pair of transparent access doors 84 that are located on a front side of the display box 100. The cabinet 22 also includes a pair of rear loading doors 86. In the illustrated embodiment, the rear doors 86 are sliding type doors while the front access doors 84 are swing type doors. Both the front and rear doors 84, 86 close access openings into the interior space to generally enclose the interior space within the cabinet 22.

The cabinet 22 also includes at least one air vent 104 located on the upper portion of the cabinet 22. In the illustrated embodiment, the cabinet 22 includes a plurality of vents 104 located on an upper surface of the cabinet 22. The vents desirably are adjustable so as to regulate air flow through the vents. For this purpose, the illustrated vents 104 include operator 106 that can be moved to open and close the vents 104, as well as vary the opening degree of the vents between these two extremes. Although not illustrated, other devices may be used to regulate or further regulate air flow through the vents. For instance, one or more fan units can be employed to promote air flow through the cabinet.

Multiple donut trays 82 can be placed within the display cabinet 22 and positioned therein so as to be viewed at least through the front access doors 84 and from the top side of the display case. The donut trays 82 are supported by bar supports 81, which extend between and are attached to the side walls 83 of the display box 100. In the illustrated embodiment, the display trays 82 are inclined so as to slope slightly downward toward the front access doors 84. This arrangement improves display and access to the donuts on the trays 84, as known in the art.

A lighting system illuminates the donuts within the display cabinet 22. The lighting system desirably includes a hot lighting source 92 (i.e., a thermal light source) and a cold lighting source 94. The hot and cold lighting sources 92, 94 are selected to have overlapping spectral content so as to collectively provide generally full-spectrum white light. In addition, the hot light source 92 desirably emits sufficient heat to warm the interior of the display box 100. In an exemplary embodiment, the hot lighting source 92 comprises one or more incandescent light bulbs or quartz lamps (e.g., halogen lights), and the cold lighting source 94 comprises one or more fluorescent light bulbs. As described below, these lighting sources 92, 94 are arranged within the cabinet 22 such that virtually every location within the interior space is directly illuminated by at least one fluorescent light and at least one incandescent light, thereby providing an essentially full-spectrum white light for illumination of the display contents (e.g., the donuts).

Furthermore, in the cabinet of FIG. 10 the cooler fluorescent lights 94 are located towards the front of the illuminated display cabinet 22, relatively close to the front access doors 84. A protective grating 96 is located over each light 94, which serves to reflect light back towards to food items, to reduce glare and to prevent consumers front inadvertently contacting the fluorescent tubes. The warmer incandescent lights 92, on the other hand, are located in protective wells 98 along the rear wall 80 of the cabinet. This allows the incandescent lights 92 to illuminate and warm the displayed food (not shown in FIG. 10), while remaining substantially distant from consumers obtaining food from the cabinet. In addition, locating the incandescent lights 92 along the rear wall will reduce the ambient temperature of the front wall of the cabinet.

In addition to providing a particular spectrum content, the hot light source 92 also heats the cabinet 22, at least to some degree. In order to maintain a desired temperature within the cabinet (e.g., 85° F. to 110° F.), a control device including one or more temperature sensing devices is connected to one or more of the incandescent lights 92 to regulate the hot lighting source. In the illustrated embodiment, a thermostat 102 is placed in series with at least some of the incandescent lights 92. The thermostat 102 regulates an upper temperature limit within the cabinet 100 by deenergizing at least a portion of the incandescent lights 92 for a period of time in order to lower the cabinet temperature. In this manner, the control device 102 prevents the temperature within the cabinet 22 from becoming too hot so as to dry out the donuts, while still heating the donuts to preserve that "fresh-baked" quality.

The temperature of the cabinet 22 can also be adjusted by varying the opening degree of the vents 104 on top of the cabinet 22. Hot air rises of course, and a greater degree of vent openings allows more hot air to escape from the vents 104, thereby reducing the temperature within the cabinet 22. By correctly balancing the wattage of the high light source 92 and the opening degree of the adjustable vents 104, a desired temperature (e.g., 90° F.) can be maintained within the cabinet 22 while leaving the hot light source 92 illuminated for almost all the time that the cold light source is lit.

As previously noted, the present invention allows a convenience store retailer to quickly and easily produce donuts having a "fresh-baked" quality using equipment currently utilized in and/or easily adapted to the standard convenience store environment. Because such equipment is utilized, the procedures described in the disclosed method can be easily taught to existing store personnel, obviating the need for specialized training or skilled operators. In addition, while the finishing operation will be most easily accomplished on a specialized donut "finishing table," the finishing operation can be accomplished on virtually any flat, horizontal work area, possibly obviating the need in some applications for additional specialized equipment.

Furthermore, because this method allows donuts to be stored for long periods of time without substantial loss of moisture and freshness, and then quickly prepared, the retailer is able to quickly accommodate surges and/or ebbs in donut demand on an hourly or daily basis, thus minimizing unsold donuts and maximizing profit potential. Instead of being forced to estimate sales on a daily or weekly basis and ordering large supplies of perishable donuts each morning and/or afternoon, the convenience store retailer can now tailor donut production to only those donuts needed, can immediately increase or decrease donut production in response to unanticipated demands throughout the day, and can replenish the supply of "fresh-baked" donuts on an hourly basis. In addition, the retailer can alter the "mix" of donut toppings and fillings on-site, thereby easily producing more of the donut types currently selling, further increasing the retailer's ability to meet unanticipated demands. The present invention also obviates the trouble and expense associated with scheduling and receiving shipments of "fresh-baked" donuts at the convenience store location each morning and/or afternoon.

It should be noted that, while the preferred method utilizes a heatable tray for both the thawing and heating operations, a non-heatable tray can alternately be used for the thawing operation, and then the thawed donuts can be transferred to a heatable tray for the final heating stage. Furthermore, the frozen donuts can be shipped from the manufacturing facility pre-packaged on trays and/or in sealed bags, so as to further simplify the retailer's final donut production. This packaging form also would permit the donuts to be shipped to and stored at the retail store under refrigerated conditions, rather than frozen. Equipment and shipping costs thereby would be reduced.

The arrangement of the equipment used with the present production process also promotes efficiencies in the process. The close proximity of refrigerator 20 to the oven 24, of the oven 24 to the finishing table 26, and the finishing table 26 to the display case 22, allow the workers to move between these components with little wasted movement. In addition, the equipment occupies a small space in the convenient store which, in the embodiment disclosed in FIG. 3, might be as little as 14'×9', and utilizes equipment that can also be used in other applications within the store. For instance, the conveyor oven 24 can be used to heat other food items, such as pizzas, hot dogs, corn dogs, etc., and the refrigerator can be used to store such items before heating. The display case 22 can also be used to display other items. Thus, the present process principally utilizes equipment commonly found in most convenience-type stores.

While the present invention has been described with reference to the production of donuts having a "fresh-baked" quality at a retail establishment, it is understood that the present invention can be equally applied to the production of products having similar "fresh-baked" characteristics for domestic use. In addition, it is understood that the present method can be equally applied to the production of other dough-based products such as breads, pastries, rolls and the like. Accordingly, the present invention is not to be limited by the recited preferred production process, but is intended to be defined solely by reference to the appended claims.

What is claimed is:

1. A tool for applying a generally even layer of generally fluid material to a comestible product, comprising:

a hopper having an elongated shape and including a pair of converging wall sections, each wall section having an inner surface, and an elongated slot formed along a lower portion of the hopper between the wall sections, the slot having a length and a width; and a ledge surface positioned beneath the slot and extending entirely across the width of the slot, said ledge being inclined relative to a flow axis through the slot and being generally coplanar with one of the inner surfaces of the pair of converging wall sections.

2. The tool of claim 1, wherein the length of the slot is generally coextensive with a length of the hopper.

3. The tool of claim 1, wherein each of the pair of converging wall sections includes a lower end, the lower ends of the wall sections configured to have a generally V-shape in cross section, and the slot being defined between the lower ends of the wall sections, and the ledge surface extends from one of said lower ends of said wall sections and beneath and beyond the lower end of the other wall section.

4. The tool of clam 3, wherein the ledge surface extends beyond the lower end of the other wall section by an amount smaller than a spacing between the lower ends of the converging wall sections.

5. The tool of claim 4, wherein the ledge surface extends beyond the lower end of the other wall section by an mount smaller than half of the spacing between the lower ends of the converging wall sections.

6. The tool of claim 1, wherein the ledge section and the corresponding wall section are unitary with the ledge surface being formed as an extension of the corresponding wall section.

7. The tool of claim 1, wherein the hopper includes an upper elongated opening that is larger than the slot.

8. The tool of claim 1 additionally including a handle that is attached to the hopper.

9. The tool of claim 1, wherein said slot is variable in length.

10. The tool of claim 9, wherein the hopper includes a sidewall and a movable member with the slot being formed at least in part therebetween, and said movable member is movable relative to the sidewall to vary the effective length of the slot between the sidewall and the movable member.

11. The tool of claim 10, wherein the hopper is configured to hold a volume of fluid material between the first and second side walls.

12. A tool for applying a generally even layer of generally fluid material to a comestible product, comprising:

a hopper having an elongated shape and including a pair of converging wall sections, each wall section having an inner surface, and an elongated slot formed along a lower portion of the hopper between the wall sections, the slot having a length and a width; and a ledge positioned beneath the slot and extending entirely across the width of the slot, said ledge being inclined relative to a flow axis through the slot and being generally parallel to one of the inner surfaces of the pair of converging wall sections.

13. The tool of claim 12, wherein the length of the slot is generally coextensive with a length of the hopper.

14. The tool of claim 12, wherein each of the pair of converging wall sections includes lower end, the lower ends of The wall sections configured to a generally V-shape in cross section, and the slot being defined between the lower ends of the wall sections, and the ledge extends from one of said lower ends of said wall sections and beneath and beyond the lower end of the other wall section.

15. The tool of claim 14, wherein the ledge extends beyond the lower end of the wall section by an amount smaller than half spacing between the lower end of the converging wall sections.

16. The tool of claim 15, wherein the ledge extends beyond the lower end of the wall section by an amount smaller than half spacing between the lower end of the converging wall sections.

17. The tool of claim 12, wherein the ledge and the wall section are unitary.

18. The tool of claim 12, wherein the slot is variable in length.

19. The tool of claim 18, wherein the hopper includes a side wall and a movable member with the slot extending at least in part therebetween, and the movable member is movable relative to the sidewall to vary the effective length of the slot between the sidewall and the movable member.

* * * * *